Oct. 21, 1952 J. D. RUSSELL 2,614,327
OSCILLOGRAM READER
Filed May 14, 1949 2 SHEETS—SHEET 2

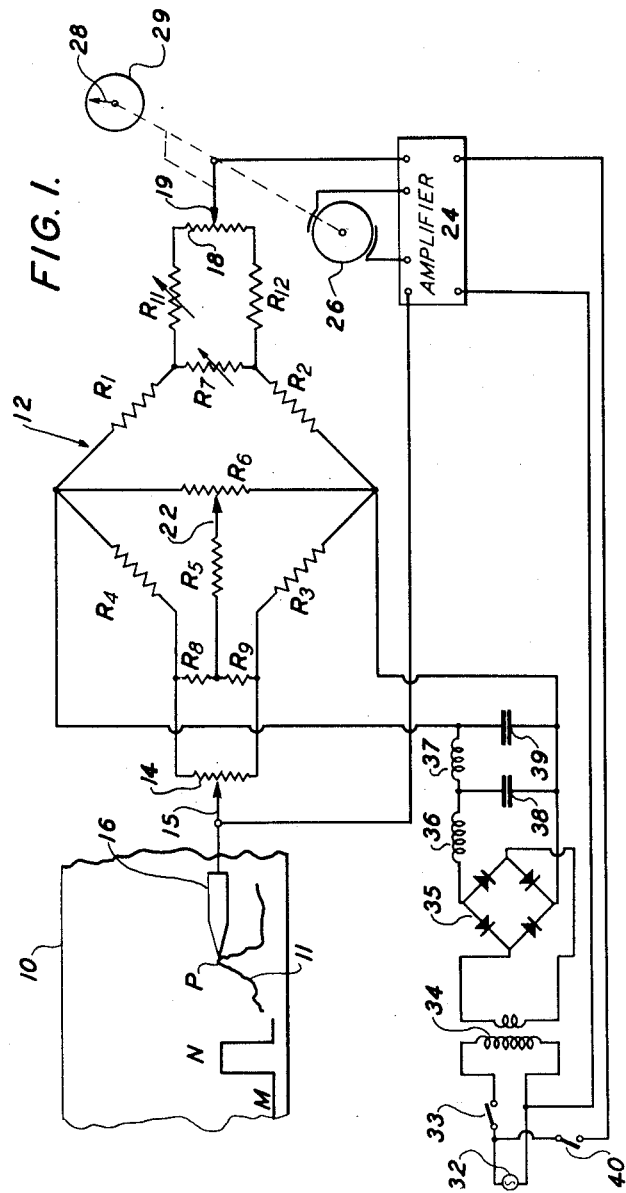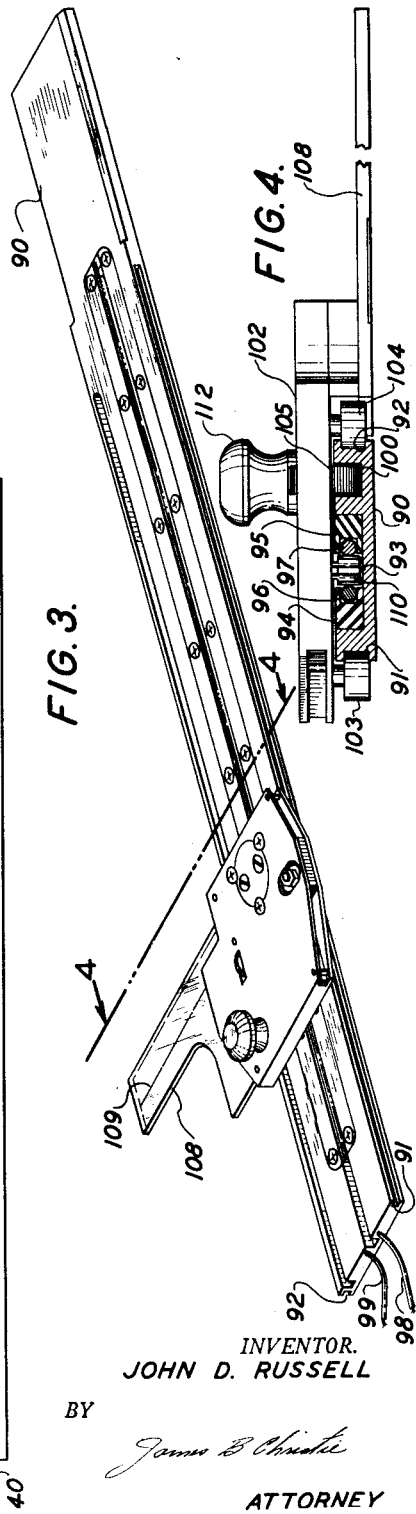

INVENTOR.
JOHN D. RUSSELL
BY
James B. Christie
ATTORNEY

Patented Oct. 21, 1952

2,614,327

UNITED STATES PATENT OFFICE 2,614,327

OSCILLOGRAM READER

John D. Russell, Los Angeles, Calif.

Application May 14, 1949, Serial No. 93,250

16 Claims. (Cl. 33—1)

This invention relates to measuring apparatus which finds particular application as an oscillogram reader to facilitate the use of oscillographic recorders.

Oscillographic recording is playing an ever increasing part in scientific and engineering research and development in providing an uninterrupted record of the fluctuations in many process and mechanical variables as for example, pressure, temperature, acceleration, stresses and strains, and many others. With the expanded use of oscillographic recordings of such data, the time expended in interpreting the recordings is of considerable importance.

An oscillographic strip chart is normally provided with both longitudinal and transverse calibrations; the longitudinal calibrations serving as a guide to elapsed time and the transverse calibrations serving as a guide to the magnitude of the measured variable. However, except where the recorded "curve" or trace falls squarely on one of the calibrations it is not possible to assign accurate values to the variable represented by the trace by visual observations. Accordingly, the general practice is to "read" such oscillograms with the aid of a ruler and a slide rule, the ruler to determine the magnitude of the fluctuations, the slide rule to correct these values for the chart "zero" level, the base line of the particular curve read, and the sensitivity calibration of the instrument. Interpreting even a single trace in this fashion is a long and tedious procedure.

Recently, oscillogram readers have been developed to expedite this process by automatically measuring the trace fluctuations and correcting for the "zero" and sensitivity factors. Such instruments have generally been mechanical in nature and hence have possessed the disadvantages of difficult sensitivity and zero adjustment, limited range, introduction of error from wear, and limitation to the reading of a single channel. I have now developed an oscillogram reader incorporating an electrical circuit and which gives a direct measure of the exact value of the particular variable represented by each point on the oscillogram trace. Moreover, the instrument of the invention provides a simple means for adjusting the zero and sensitivity, has a wide range of adjustment, is insensitive to changes in ambient temperature, is not subject to wear in any part affecting the accuracy of the instrument, and is equally suitable to reading a plurality of traces on a multiple channel record.

In one embodiment, the oscillogram reader of the invention comprises a linear input potentiometer having a tap mechanically connected to a pointer, a bridge network connected across the linear potentiometer, an output potentiometer connected across the output of the bridge, an amplifier connected across the input and output of the bridge, a motor driven by the amplifier and operable to adjust the tap of the output potentiometer to produce a balance between the input and the output. A suitable meter or dial is mechanically linked to the motor to give a reading proportional to the excursions of the tap on the output potentiometer. Means are provided in the circuit to adjust the proportionality factor between the meter deflections and the potentiometer tap excursions making it possible to take into account the scaler sensitivity of the oscillogram. Means are also provided for pre-adjustment of the circuit so that the zero reading of the meter corresponds to the zero condition of the variable being measured. In this manner any discrepancy between the "zero" or base line on the chart and the zero level of the subject trace is automatically compensated for.

The reader described above represents a simplified embodiment of the invention. As indicated it is within the contemplation of the invention to provide an oscillogram reader adapted to successive or alternate reading of a plurality of traces on a single chart. Such a reader differs from that described above in the inclusion of a plurality of means for adjusting the proportionality factor between the meter deflections and the potentiometer tap excursions and a plurality of means for adjustment of the circuit to compensate for discrepancies between the zero level of the chart and the zero level of the particular trace. These plurality of means are separately connectable in the circuit through an appropriate selector switch. As the pointer connected to the tap of the input potentiometer is moved from one trace to another, correct readings are automatically obtained by adjusting the selector switch to place in the circuit the particular adjusting means corresponding to the trace being read.

As described above, the input potentiometer is preferably a linear potentiometer which comprises an elongated slide wire with a tap moveable along the length of the wire. This tap is mechanically connected to a pointer by means of which the oscillogram trace is followed. I have provided a convenient potentiometer tap and pointer arrangement wherein the tap and pointer are mounted on a slider slidable on an elongated body member in which a linear slide wire is embedded.

These and other features of the invention will become apparent from the detailed description thereof taken in conjunction with the accompanying drawing in which:

Fig. 1 is a circuit diagram of one embodiment of the invention;

Fig. 3 is a perspective view showing the potentiometer and slider arrangement; and Fig. 4 is a sectional elevation taken on the line 4—4 of Fig. 3.

Figure 2:
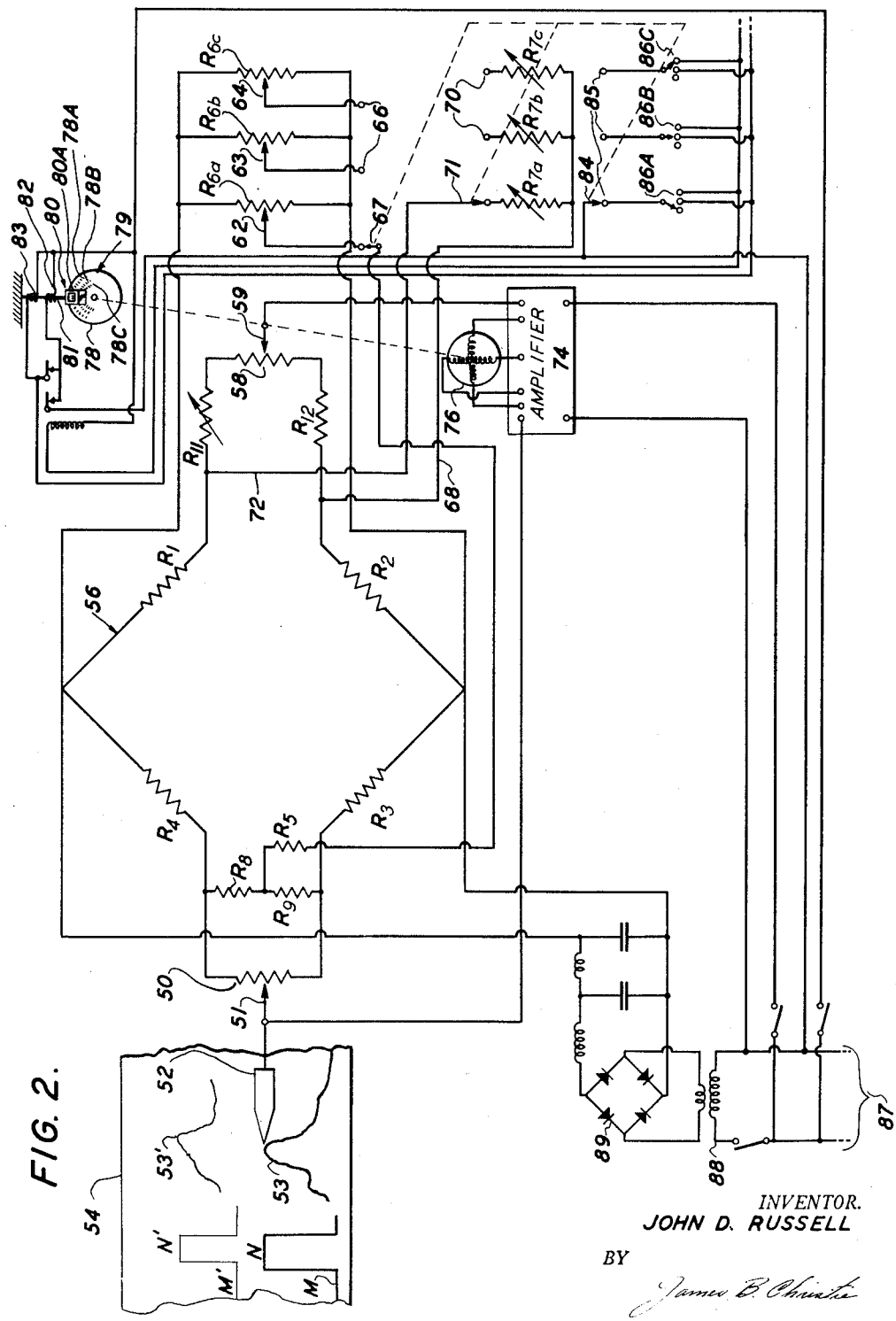
Fig. 2 is a circuit diagram of the invention particularly adapted to multiple channel reading.

In Fig. 1 a single channel oscillogram reader in accordance with the invention is shown in association with a portion of an oscillogram strip chart 10 having a trace 11 marked thereon. A linear input potentiometer 14 having an adjustable tap 15 is provided with a pointer 16 mechanically connected to the tap and by means of which the trace 11 is followed on the record 10. The movement of the pointer 16 along the trace 11 produces corresponding movement of the tap 15 on potentiometer 14. A bridge circuit comprising the legs $R_1$, $R_2$, $R_3$, and $R_4$, is connected in the circuit with the legs $R_4$ and $R_3$ of the bridge connected through potentiometer 14. The opposite legs $R_1$ and $R_2$ of the bridge are connected through a variable resistance $R_{11}$ and a fixed resistance $R_{12}$ to an output potentiometer 18 having an adjustable tap 19. A potentiometer $R_6$ is connected across the bridge and has a center tap 22 connected through a resistance $R_5$ to the mid point of a pair of resistances $R_8$, $R_9$ connected serially across the output of the input potentiometer 14. A variable resistance $R_7$ is connected between legs $R_1$ and $R_2$ of the bridge and hence across the output potentiometer 18. An amplifier 24 is connected between the tap 15 of the input potentiometer 14 and the tap 19 of the output potentiometer 18 and serves to amplify any potential appearing between the taps 15 and 19. A motor 26 is connected to be driven by the amplifier and is mechanically connected to the tap 19 of output potentiometer 18 and also to a needle 28 of an indicating dial 29.

D. C. voltage is supplied to the bridge from an A. C. source 32 through a switch 33, transformer 34 and rectifier 35. The D. C. output of rectifier 35 is connected across the bridge between the junctures of legs $R_1$ and $R_4$ and legs $R_2$ and $R_3$ respectively, the circuit being provided with conventional choke coils 36, 37 and condensers 38, 39 to exclude all A. C. components from the bridge circuit. The A. C. source 32 also feeds amplifier 24 through a switch 40. If amplifier 24, motor 26 and potentiometer are representative of a commercially available automatic balancing potentiometer, the unit will include a rectifier and hence may be connected directly to the A. C. source as shown.

This system is essentially a null system, the amplifier and motor operating to adjust tap 19 of the output potentiometer to balance the voltage appearing between taps 15 and 19 of the input and output potentiometers respectively. In using the apparatus illustrated in Fig. 1 the sequence of operation is as follows:

The sliding pointer 16 is placed on a calibration curve of the physical quantity to be measured. Assuming that a zero condition exists in the physical quantity represented by the trace at point M, the pointer is first aligned with the trace at this point. The adjustable tap 22 of potentiometer $R_6$ is adjusted to vary the shunt across the bridge circuit until the circuit is balanced. At this condition dial 29 of the indicating instrument 29 registers zero. After the zero adjustment has been made, the pointer 16 is then moved to the top of the calibration square wave, represented by the point N which corresponds to a known value of the physical quantity to be measured. With the pointer at point N, the variable resistance $R_7$ is adjusted until the dial reading of instrument 29 corresponds with the known value represented by point N.

Normally the shunting potentiometer $R_6$ and the variable resistance $R_7$ are the only elements of the circuit which require adjustment. By means of these elements, the "zero" level and sensitivity of the oscillogram with respect to the given physical quantity are "set in" in the reader. Once these have been properly "set in" in the manner above described, the amplitude values of a trace deflection, as for example, the point P, may be read directly on the dial of instrument 29 merely by placing the pointer 16 on the point P.

Resistances $R_{11}$ and $R_{12}$ form a semi-permanent adjustment network to balance the circuit so that the position of tap 19 on the output potentiometer 18 is at the actual center point of the potentiometer when the dial reads zero. The adjustment of variable $R_{11}$, once made, need not be changed. Making the zero of the dial correspond to the center point of the network makes the bridge balancing potentiometer $R_6$ independent of changes in the adjustment of variable resistance $R_7$. Hence $R_6$ and $R_7$ need to be adjusted only once for a given zero and sensitivity adjustment.

If no zero trace has been recorded it is still possible to adjust the circuit for direct reading provided a calibration square wave or other means is available to adjust the sensitivity. Hence, if two known values of the quantity to be measured are determinable from a calibration curve the circuit can be set with respect to sensitivity. In this manner the zero on the dial will automatically correspond to the zero level of the trace.

The circuit of Fig. 1 represents a simplified form of the invention adapted for use with a single channel oscillogram. This circuit may be modified as shown in Fig. 2 to adapt it to a multichannel instrument which permits changing from one trace to another without readjustment of the zero and sensitivity controls once they have been set for a channel to be examined.

The apparatus shown in Fig. 2 comprises a linear input potentiometer 50 having an adjustable tap 51. The tap 51 is connected to a pointer 52 by means of which a trace 53 on an oscillogram 54 may be followed. As in the foregoing embodiment deployment of pointer 52 along trace 53 produces corresponding excursion of tap 51 on potentiometer 50. A bridge circuit 56 comprising the legs $R_1$, $R_2$, $R_3$ and $R_4$ is connected in the circuit. Potentiometer 50 is connected between adjoining legs $R_3$ and $R_4$. The opposing legs $R_1$ and $R_2$ of the bridge 56 are connected through a variable resistance $R_{11}$ and a fixed resistance $R_{12}$ across an output potentiometer 58 having an adjustable tap 59. To this extent the circuit of Fig. 2 is substantially identical to that of Fig. 1.

To adapt the circuit to multi-channel reading, the potentiometer $R_6$ of Fig. 1 is replaced by a plurality of potentiometers $R_6a$, $R_6b$, $R_6c$, etc. The center taps 62, 63, 64 respectively, of the potentiometers $R_6a$, $R_6b$, $R_6c$, are connected to separate terminals 66 of a selector switch 67. The selector switch 67 is connected through a limiting resistor $R_5$ to the mid point of resistors $R_8$ and $R_9$. Resistors $R_8$ and $R_9$ are in turn connected across potentiometer 50. The resistors $R_8$ and $R_9$ provide a center tap for connection of the taps 62, 63, 64 of the respective potentiometers in the same fashion as shown in Fig. 1. Resistors $R_8$ and $R_9$ may be changed together in value to provide a coarse change in sensitivity.

The variable resistance $R_7$ in the circuit of Fig. 1 is replaced by a plurality of variable resistances $R_7a$, $R_7b$, $R_7c$. One side of each of the resistances is connected through a common line 68 to the leg $R_2$ of bridge 56. The other side of each of the resistances $R_7a$, etc. is connected to a separate terminal 70 of a selector switch 71. The selector switch 71 is connected through line 72 to leg $R_1$ of bridge 56. Hence by use of selector switch 71 the resistances $R_7a$, etc. may be selectively placed in the circuit in the same manner as resistance $R_7$ in Fig. 1.

An amplifier 74 is connected between taps 51 and 59 of the input and output potentiometers 50, 58 respectively, and a motor 76 is connected to be energized by the output of amplifier 74. The motor 76 is mechanically coupled to tap 59 of the output potentiometer and to the dial 78 of an indicating instrument 79. As in the foregoing embodiment, any unbalance between taps 51 and 59 is amplified and employed to drive motor 76. The motor in turn adjusts tap 59 to balance the system, the excursions of tap 59 being indicated by rotation of the dial 78 of the indicating instrument.

Since the sensitivity of the indicating instrument is determined by the trace itself, it may vary over wide limits from trace to trace. Accordingly, it is desirable to provide the indicating instrument with some form of variable calibration or dial scale so that the maximum dial range for each trace can be utilized. In the apparatus of Fig. 2 it is further desirable to provide means for preselecting an appropriate instrument scale for each trace. One such means is shown diagrammatically in Fig. 2 wherein the dial 78 of indicating device 79 is provided with three scales 78A, 78B, 78C. A blanking panel 80 is suspended over the face of the dial and has a window 80A through which only one dial scale may be viewed. The blanking panel 80 is suspended on a shaft 81, the vertical position of which is adjustable by a pair of solenoids 82, 83. Thus the panel 80 may be set in any one of three positions; i. e. aligned with scale 78A when both solenoids are energized, and aligned with scale 78C when neither solenoid is energized. The solenoids 82 and 83 operate in tandem on the shaft 81 so that energization of solenoid 83 will raise the shaft one position above the position it assumes when only solenoid 82 is energized.

The positioning of the blanking panel for each separate trace may be preselected by selector switch 84 with contact terminals 85, the three terminals illustrated corresponding to the terminals 66 and 70 of the sensitivity and balancing circuits. The terminals 85 are each connected to a separate manual switch 86 by means of which the desired position of the blanking panel can be set. Thus the left hand contact of each of switches 86 is dead, the center contact energizes solenoid 83 and the right hand contact energizes both solenoids.

Selector switches 67, 71 and 84 are ganged so that when one is set for reading of a particular trace, each will be set for that trace. It is obvious that any number of traces may be read with the instrument of Fig. 2 by providing a corresponding number of balancing potentiometers, and sensitivity adjusting resistors. In the same fashion selector switch 84 may be provided with any number of contacts 85 so that the appropriate one of the several dial scales can be selected for each trace. Further, the dial may be provided with any number of scales with an appropriate number of tandem arranged solenoids and an appropriate number of contacts in the selecting switches 86 so that a different scale may be selected for each of several traces.

A similar scale switching means may be employed with the apparatus of Fig. 1. In this application automatic scale selection is not important and the blanking panel 80 may be adjusted to the proper location manually for each new trace to be read.

A D. C. voltage is supplied to the bridge in the apparatus of Fig. 2 as in the foregoing embodiment, from an A. C. source 87 through a transformer 88 and rectifier 89. A. C. power is supplied to amplifier 74 and the scale blanking device 80 from the same source.

The operation of the apparatus of Fig. 2 is essentially the same as the apparatus of Fig. 1. With pointer 52 at the point M selector switches 67, 71 and 84 are positioned to place the potentiometer $R_6a$, variable resistance $R_7a$ and switch 86A in the circuit. $R_6a$ is then adjusted so that the dial 78 of instrument 79 shows a zero reading assuming that the point M represents the zero condition of the quantity represented by trace 53. The pointer 52 is then moved to point N of the calibration curve, this point representing a known value of the physical condition represented by trace 53. Variable resistance $R_7a$ is then adjusted so that the dial 78 of the instrument 79 shows the value represented by the point N. At this point, the proper scale on dial 78 for the trace 53 is selected by setting switch 86A. Pointer 52 is then moved to the point M' which represents the zero level, as provided by a calibration curve, of a second trace 53' representing a physical quantity different from that of the trace 53. Selector switches 67, 71 and 84 are adjusted to place potentiometer $R_6b$, variable resistances $R_7b$ and switch 86B in the circuit, thereby taking potentiometer $R_6a$, variable resistance $R_7a$ and switch 86A out of the circuit. $R_6b$ is then adjusted until dial of instrument 79 reads zero with pointer 52 at the point M'. $R_7b$ is likewise adjusted, with the pointer at the point N', to give a reading corresponding to the value represented by the point N', and switch 86B is set to select the proper scale for trace 53'.

In the same manner, additional channels may be "set in" in the instrument by adjustment of potentiometer $R_6c$, etc. Thereafter to switch from traces 53 to 53' and so on, it is only necessary to position the adjuster switches 67, 71 and 84 so that appropriate ones of potentiometers $R_6a$ etc., variable resistances $R_7a$, etc., and switches 86A, etc., are placed in the circuit.

Conveniently selector switches 67, 71 and 84 are ganged, as shown in Fig. 2, or are contained in a single multiple level switch. If so arranged a single adjustment will place the proper ones of potentiometers $R_6a$, etc., resistances $R_7a$, etc., and switches 86A in the circuit. In this fashion, selection of the proper potentiometer, for example, will automatically insure selection of the proper variable resistance.

The apparatus of Figs. 1 and 2 include an automatic balancing potentiometer arrangement, i. e. the output potentiometer, amplifier and motor. This type of arrangement is preferred because of its simplicity and accuracy, but it may be replaced by less expensive instruments. For example, a micro-ammeter may be used to measure current flow between the input and output potentiometers.

A convenient mechanical arrangement for the pointer and slide wire input potentiometer combination is illustrated in perspective in Fig. 3 and in sectional elevation in Fig. 4. The apparatus there shown comprises an elongated track member 90 having grooves along its longitudinal edges at 91 and 92. The central portion of the upper face of track 90 is cut out to form a channel 93 in which are mounted insulating elements 94, 95 along opposite sides of the channel. A slide wire is embedded in the insulating elements 94, 95 with two legs 96, 97 of the wire running along one side of the channel and back along the other side, the legs being electrically connected in the circuit through an end of the track 90 by leads 98, 99 respectively. The upper face of track 90 is also provided with a longitudinal guide groove 100.

A carriage 102 is mounted to slide along the track 90 and is provided with dependent rollers 103, 104 engaging in grooves 91, 92 and roller 105 engaging in groove 100. An elongated trace follower arm 108 is mounted to and extends outwardly from the carriage. The trace following arm 108 is provided with a hair line 109 by means of which the trace is followed. A contacting element 110 depends from carriage 102 and rides in the groove 93 in engagement with slide wires 96, 97. A knob 112 affixed to the carriage furnishes convenient means for manipulating the carriage.

In operation a trace on an oscillogram is followed with the hair line 109 by moving the carriage as necessary. Movement of the carriage responsive to fluctuations in the trace produces corresponding movement of contacting element 110, hence altering the setting of the potentiometer. The effects of such alteration have been previously described. It is understood that any type of slide wire potentiometer may be employed, the particular embodiment shown in Figs. 3 and 4 being merely illustrative of a convenient potentiometer for this particular application.

As mentioned above, the automatic balancing potentiometer arrangements shown in apparatus of Figs. 1 and 2 may be replaced by less expensive and less convenient instruments such as a micro-ammeter. Such replacement would eliminate amplifier motor and the indicating instrument. However, the automatic balancing potentiometer is preferred since it greatly facilitates operation of the instrument. The use of recording instruments and card punch machines in conjunction with the oscillogram reader of the invention is possible, the unbalance produced in the system being applied to operate such recording devices as tabulating machines replacing the illustrated indicating instrument. Generally, however, the immediate determination of test values is desired, and in such case the use of an indicating type of instrument, as shown, is preferred.

Although the apparatus has been described as operated in conjunction with a moving chart, it is also possible to move the whole instrument in a direction parallel to the record so that a record length may be surveyed without actually moving the record. However, it is usually more convenient to move the record with respect to the oscillogram reader.

The resolution of the oscillogram reader of the invention is .005 inch which is less than the errors introduced by the operator. For the usual oscillogram where 2 to 4 inches deflection is provided, this error is insignificant. For oscillograms of smaller amplitudes the oscillogram reader of the invention may be used in conjunction with commercially available oscillogram enlargers.

Many other modifications in the apparatus may occur to those skilled in the art without departing from the scope of the invention.

I claim:

1. An oscillogram reader comprising a bridge, an input potentiometer connected between adjoining legs of the bridge, a pointer connected to the tap of the input potentiometer for following a trace on the oscillogram, an output potentiometer connected between the other two arms of the bridge, a pair of resistances connected in series across the input potentiometer, a third adjustable tap potentiometer connected across the bridge, means connecting the tap of the third potentiometer to the junction between said pair of resistances, and means for measuring the potential between the taps of the input and output potentiometers.

2. An oscillogram reader comprising an electrical bridge, an adjustable tap linear input potentiometer connected between adjoining legs of the bridge, a pointer connected to the tap of the input potentiometer for following a trace on the oscillogram, adjustable resistance means connected in shunt with the respective legs of said adjoining legs of the bridge for controlling the flow of current through said adjoining legs and thereby adjusting the zero level of the bridge, an adjustable tap output potentiometer connected between the other two arms of the bridge, and means for measuring changes in potential between the taps of the input and output potentiometers responsive to movement of said pointer.

3. An oscillogram reader comprising an electrical bridge, a first adjustable tap linear input potentiometer connected between adjoining legs of the bridge, a pointer connected to the tap of the first potentiometer for following a trace on the oscillogram, a second adjustable tap output potentiometer connected between the other two arms of the bridge, a pair of resistances connected in series across the first potentiometer, a third adjustable tap potentiometer connected across the bridge, means connecting the tap of the third potentiometer to the junction between said pair of resistances, means for measuring the potential between the taps of the input and output potentiometers, and means for adjusting the sensitivity of the bridge.

4. An oscillogram reader comprising an electrical bridge, a first adjustable tap linear potentiometer connected between adjoining legs of the bridge, and having a pointer connected to the tap for following a trace on the oscillogram, adjustable resistance means connected in shunt with the respective legs of said adjoining legs of the bridge for controlling the flow of current through said adjoining legs and thereby adjusting the zero level of the bridge, a second adjustable tap potentiometer connected between the other two arms of the bridge, means for automatically adjusting the tap of the second potentiometer responsive to the potential difference between the taps of the two potentiometers as determined by changes in the setting of the first potentiometer, and means for measuring the adjustment required to achieve a null balance.

5. Apparatus according to claim 4 wherein said first potentiometer comprises an elongated track member, a carriage slidable on the track and carrying said pointer extending perpendicularly from the track, an elongated channel in the track parallel to the longitudinal axis thereof, an elongated wire running along one side of said channel and back along the other side, and contact means depending from said carriage in contact with said wire on both sides of the groove.

6. An oscillogram reader comprising a bridge, a first adjustable tap potentiometer, two arms of the bridge being connected through said first potentiometer, means for following a trace on the oscillogram and causing the tap of the first potentiometer to move responsive thereto, a first variable resistance connected between the opposite arms of the bridge, a second adjustable tap potentiometer connected across said first variable resistance, a fixed resistance connected in series between one side of said second potentiometer and said first variable resistance, a second variable resistance connected in series between the other side of said second potentiometer and said first variable resistance, a source of D. C. voltage connected across the bridge, a third adjustable tap potentiometer connected across the bridge, the tap of the third potentiometer being connected across the first potentiometer through two centering resistors, and means for measuring the unbalance between the taps of the first and second potentiometers.

7. Apparatus according to claim 6 wherein the means for measuring the unbalance between the taps of the first and second potentiometers comprises an amplifier connected between said taps to amplify the unbalance potential, a motor connected to be energized by said amplifier, means mechanically connecting the motor to the tap of said second potentiometer, and an indicating instrument connected to indicate the excursions of said tap.

8. Apparatus according to claim 7 wherein said indicating instrument includes a dial rotatable responsive to excursions of said tap of said second potentiometer, a plurality of indicating scales on said dial spaced radially from each other, an observation window suspended over the face of said dial and means for positioning said window in line with selected ones of said scales.

9. An oscillogram reader comprising a bridge, a first adjustable tap potentiometer, two arms of the bridge being connected through said first potentiometer, means for following a trace on the oscillogram and causing the tap of the first potentiometer to move responsive thereto, a first variable resistance connected between the opposite arms of the bridge, a second adjustable tap potentiometer connected across said first variable resistance, a fixed resistance connected in series between one side of said second potentiometer and said first variable resistance, a second variable resistance connected in series between the other side of said second potentiometer and said first variable resistance, a source of D. C. voltage connected across the bridge, a third adjustable tap potentiometer connected across the bridge, the tap of the third potentiometer being connected across the first potentiometer through two centering resistors, and means for adjusting the tap of the second potentiometer responsive to the voltage between the taps of the first and second potentiometers to balance the bridge, and means for measuring the movement of the tap of said second potentiometer to achieve said balance.

10. Measuring apparatus comprising a bridge, a first adjustable tap potentiometer connected between two adjoining arms of the bridge, a second adjustable tap potentiometer connected between the opposite adjoining arms of the bridge, means for adjusting the tap of said first potentiometer relative to the function to be measured, a plurality of variable resistances, a common lead connecting one side of each of said plurality of variable resistances to one of said opposite adjoining arms, a first selector switch connected to the other of said opposite adjoining arms and to the other side of each of said variable resistors, a plurality of adjustable tap potentiometers connected in parallel across the bridge, a second selector switch, a pair of series arranged resistors connected across the first potentiometer, the second selector switch being connected between said resistors and to the adjustable taps of each of said plurality of adjustable tap potentiometers, a source of D. C. voltage connected across the bridge, and means for determining the unbalance produced between the taps of said first and second potentiometers by a change in the position of the tap of said first potentiometer.

11. An oscillogram reader comprising a bridge, a first adjustable tap potentiometer connected between two adjoining arms of the bridge, and having a pointer mechanically connected to the tap of the first potentiometer, a second adjustable tap potentiometer connected between the opposite adjoining arms of the bridge, a plurality of variable resistances, a common lead connecting one side of each of said plurality of variable resistances to one of said opposite adjoining arms, a first selector switch connected to the other of said opposite adjoining arms and to the other side of each of said variable resistors, a plurality of adjustable tap potentiometers connected in parallel across the bridge, a second selector switch, a pair of series arranged resistors connected across the first potentiometer, the second selector switch being connected between said resistors and to the adjustable taps of each of said plurality of adjustable tap potentiometers, a source of D. C. voltage connected across the bridge, and means for adjusting the tap of said second potentiometer to balance the system and responsive to the voltage between the taps of the first and second potentiometers as determined by movement of said pointer.

12. Apparatus according to claim 11 wherein said first potentiometer comprises an elongated track member, a carriage slidable on the track and carrying said pointer extending perpendicularly from the track, an elongated channel in the track parallel to the longitudinal axis thereof, an elongated wire running along one side of said channel and back along the other side, and contact means depending from said carriage in contact with said wire on both sides of the groove.

13. An oscillogram reader comprising a bridge, a first adjustable tap potentiometer connected between two adjoining arms of the bridge, a pointer mechanically connected to the tap of the first potentiometer, a second adjustable tap potentiometer connected between the opposite adjoining arms of the bridge, a plurality of variable resistances, a common lead connecting one side of each of said plurality of variable resistances to one of said opposite adjoining arms, a first selector switch connected to the other of said opposite adjoining arms and to the other side of each of said variable resistors, a plurality of adjustable tap potentiometers connected in parallel across the bridge, a second selector switch, a pair of series arranged resistors connected across the first potentiometer, the second selector switch being connected between said resistors and to the adjustable taps of each of said plurality of adjustable tap potentiometers, a source of D. C. voltage connected across the bridge, means for automatically adjusting the tap of the second potentiometer responsive to the voltage between the taps of the first and second potentiometers as determined by movement of said pointer, and means for measuring the excursions of said tap of said second potentiometer required to achieve a null balance.

14. An oscillogram reader comprising a bridge, a first adjustable tap potentiometer connected between two adjoining arms of the bridge, a pointer mechanically connected to the tap of the first potentiometer, a second adjustable tap potentiometer connected between the opposite adjoining arms of the bridge, a plurality of variable resistances, a common lead connecting one side of each of said plurality of variable resistances to one of said opposite adjoining arms, a first selector switch connected to the other of said opposite adjoining arms and to the other side of said variable resistors, a plurality of adjustable tap potentiometers connected in parallel across the bridge, a second selector switch, a pair of series arranged resistors connected across the first potentiometer, the second selector switch being connected between said resistors and to the adjustable taps of each of said plurality of adjustable tap potentiometers, a source of D. C. voltage connected across the bridge, and means for measuring the unbalance between the taps of the first and second potentiometers.

15. Apparatus according to claim 14 wherein the means for measuring the unbalance between the taps of the first and second potentiometers comprises an amplifier connected between said taps to amplify the unbalance potential, a motor connected to be energized by said amplifier, means mechanically connecting the motor to the tap of said second potentiometer, and an indicating instrument connected to indicate the excursions of said tap.

16. Apparatus according to claim 15 wherein said indicating instrument includes a dial rotatable responsive to excursions of said tap of said second potentiometer, a plurality of indicating scales on said dial spaced radially from each other, an observation window suspended over the face of said dial and means for positioning said window in line with selected ones of said scales.

JOHN D. RUSSELL.

REFERENCES CITED

The following references are of record in the file of this patent:

UNITED STATES PATENTS

| Number | Name | Date |
|---|---|---|
| 877,312 | Evershed | Jan. 21, 1908 |
| 1,086,729 | Rey | Feb. 10, 1914 |
| 2,113,436 | Williams | Apr. 5, 1938 |
| 2,154,511 | Kingsland | Apr. 18, 1939 |
| 2,212,799 | Sperry | Apr. 27, 1940 |
| 2,246,686 | Jones | June 24, 1941 |
| 2,258,859 | Mitelman | Oct. 14, 1941 |
| 2,282,442 | Whitlock | May 12, 1942 |
| 2,316,240 | Harrison | Apr. 13, 1943 |
| 2,317,419 | Raylor et al. | Apr. 27, 1943 |
| 2,367,349 | Harrison | Jan. 16, 1945 |
| 2,403,917 | Gille | July 16, 1946 |
| 2,423,620 | Ruge | July 8, 1947 |
| 2,515,349 | Kutzler et al. | July 18, 1950 |
| 2,531,200 | Davis | Nov. 21, 1950 |

FOREIGN PATENTS

| Number | Country | Date |
|---|---|---|
| 528,685 | Germany | July 4, 1931 |

OTHER REFERENCES

Pages 8 to 10 of an article entitled "Technique and Appareils," in Mesures, Jan. 1948.